(12) United States Patent
Anderson et al.

(10) Patent No.: US 6,284,089 B1
(45) Date of Patent: Sep. 4, 2001

(54) THERMOPLASTIC SEAM WELDS (75) Inventors: David M. Anderson, Issaquah; Steven E. Hahn, Federal Way; Douglas A. McCarville, Auburn, all of WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/120,500

(22) Filed: Jul. 21, 1998

Related U.S. Application Data (60) Provisional application No. 60/068,719, filed on Dec. 23, 1997.

(51) Int. Cl.⁷ .................................................. B29C 65/02
(52) U.S. Cl. .................................. 156/304.3; 156/304.5; 156/304.6
(58) Field of Search ................................. 428/58, 60, 61; 156/304.3, 304.6, 304.5

(56) References Cited

U.S. PATENT DOCUMENTS

| | | |
|---|---|---|
| 2,241,312 | 5/1941 | Luty . |
| 2,273,423 | 2/1942 | Somes . |
| 2,372,929 | 4/1945 | Blessing . |
| 2,378,801 | 6/1945 | Sidell et al. . |
| 2,423,922 | 7/1947 | Arndt, Jr. . |
| 2,589,777 | 3/1952 | Collins . |
| 2,739,829 | 3/1956 | Pedlow et al. . |
| 2,761,941 | 9/1956 | Ardichvili . |
| 2,898,435 | 8/1959 | Crafts . |
| 2,903,886 | 9/1959 | Renaut . |
| 3,101,403 | 8/1963 | Lewis et al. . |
| 3,183,460 | 5/1965 | Bennon . |
| 3,288,979 | 11/1966 | Mills et al. . |
| 3,395,261 | 7/1968 | Leatherman et al. . |
| 3,431,379 | 3/1969 | Yrene . |
| 3,450,856 | 6/1969 | Buck et al. . |
| 3,492,453 | 1/1970 | Hurst . |
| 3,507,735 | 4/1970 | Chisholm . |
| 3,574,031 | 4/1971 | Heller, Jr. et al. . |
| 3,845,268 | 10/1974 | Sindt . |
| 3,864,186 | 2/1975 | Balla . |
| 3,941,643 | 3/1976 | Balla . |
| 3,946,349 | 3/1976 | Haldeman, III . |
| 3,996,402 | 12/1976 | Sindt . |
| 4,005,302 | 1/1977 | Graf et al. . |
| 4,029,926 | 6/1977 | Austin . |
| 4,091,254 | 5/1978 | Struve . |
| 4,100,809 | 7/1978 | Bobrov et al. . |
| 4,120,712 | 10/1978 | Sindt . |
| 4,180,717 | 12/1979 | Lenk et al. . |
| 4,187,411 | 2/1980 | Bryce et al. . |
| 4,288,673 | 9/1981 | Ishibashi . |
| 4,296,295 | 10/1981 | Kiuchi . |
| 4,304,975 | 12/1981 | Lenk et al. . |
| 4,313,777 | 2/1982 | Buckley et al. . |

(List continued on next page.)

FOREIGN PATENT DOCUMENTS

| | | |
|---|---|---|
| 0 461 979 B1 | 4/1994 | (EP) . |
| 54-25542 | 2/1979 | (JP) . |

OTHER PUBLICATIONS

J. Giachino, Welding Skills and Practices, Am. Tech. Soc., Chicago, IL (1960, 1965, 1967, 1971, 1976) 393–401.

Border et al., *Induction Heated Joining of Thermoplastic Composites without Metal Susceptors*, 34th Int'l SAMPE Symp. May 8–11, 1989, pp 2569–2578.

*Primary Examiner*—Michael W. Ball
*Assistant Examiner*—Barbara J. Musser
(74) *Attorney, Agent, or Firm*—John C. Hammar (57) ABSTRACT

The present invention is a method for joining thermoplastic composite sandwich panels with thermoplastic welds (fusion bonds) made without autoclave processing of the joint. The preferred joint is a double interleaf staggered joint with supporting titanium doublers providing a tensile strength of at least 12,000 lb/in. The joint is particularly suited for joining sections of a cryogenic tank for spacecraft.

7 Claims, 8 Drawing Sheets

U.S. PATENT DOCUMENTS

| | | | | |
|---|---|---|---|---|
| 4,343,982 | | 8/1982 | Schwartz et al. . | |
| 4,355,222 | | 10/1982 | Geithman et al. . | |
| 4,382,113 | | 5/1983 | Schwartz et al. . | |
| 4,416,713 | | 11/1983 | Brooks . | |
| 4,421,588 | | 12/1983 | Davies . | |
| 4,445,951 | | 5/1984 | Lind et al. . | |
| 4,496,412 | * | 1/1985 | Ritter | 156/304.5 |
| 4,521,659 | | 6/1985 | Buckley et al. . | |
| 4,653,396 | | 3/1987 | Wennerberg . | |
| 4,671,470 | | 6/1987 | Jonas . | |
| 4,673,450 | | 6/1987 | Burke . | |
| 4,768,433 | | 9/1988 | Boissevain . | |
| 4,791,260 | | 12/1988 | Waldman . | |
| 4,822,972 | | 4/1989 | Sugioka et al. . | |
| 4,892,774 | * | 1/1990 | Vallance | 156/306.6 |
| 4,897,518 | | 1/1990 | Mucha et al. . | |
| 4,904,972 | | 2/1990 | Mori et al. . | |
| 4,919,759 | | 4/1990 | Illmarinen et al. . | |
| 4,944,185 | | 7/1990 | Clark, Jr. et al. . | |
| 4,947,464 | | 8/1990 | Mori et al. . | |
| 4,978,825 | | 12/1990 | Schmidt et al. . | |
| 5,001,319 | | 3/1991 | Holmstrom . | |
| 5,047,605 | | 9/1991 | Ogden . | |
| 5,074,019 | | 12/1991 | Link . | |
| 5,079,817 | | 1/1992 | Anstotz et al. . | |
| 5,087,500 | * | 2/1992 | Kasper et al. | 428/116 |
| 5,101,086 | | 3/1992 | Dion et al. . | |
| 5,101,663 | | 4/1992 | Narita et al. . | |
| 5,126,000 | * | 6/1992 | Takai et al. | 156/285 |
| 5,170,666 | | 12/1992 | Larsen . | |
| 5,179,860 | | 1/1993 | Tsuboi . | |
| 5,199,791 | | 4/1993 | Kasanami et al. . | |
| 5,240,542 | | 8/1993 | Miller et al. . | |
| 5,248,864 | | 9/1993 | Kodokian . | |
| 5,250,776 | | 10/1993 | Pfaffmann . | |
| 5,283,409 | | 2/1994 | Brendel et al. . | |
| 5,303,590 | | 4/1994 | Modderman et al. . | |
| 5,313,034 | | 5/1994 | Grimm et al. . | |
| 5,313,037 | | 5/1994 | Hansen et al. . | |
| 5,340,428 | | 8/1994 | Kodokian . | |
| 5,351,544 | | 10/1994 | Endo et al. . | |
| 5,408,881 | | 4/1995 | Piche et al. . | |
| 5,444,220 | | 8/1995 | Hansen et al. . | |
| 5,481,091 | | 1/1996 | Grimm et al. . | |
| 5,486,684 | | 1/1996 | Peterson et al. . | |
| 5,587,098 | | 12/1996 | Matsen et al. . | |
| 5,589,635 | | 12/1996 | Baudrillard et al. . | |
| 5,776,579 | * | 7/1998 | Jesup et al. | 428/117 |
| 5,888,610 | * | 3/1999 | Fournier et al. | 156/292 |
| 5,916,469 | * | 6/1999 | Scoles et al. | 219/633 |

* cited by examiner

Temperature Profile

Fig. 15

THERMOPLASTIC SEAM WELDS

REFERENCE TO RELATED APPLICATIONS

The present application claims the benefit of U.S. Provisional Application No. 60/068,719, filed Dec. 23, 1997.

TECHNICAL FIELD

The present invention relates to a process for joining honeycomb sandwich panels with thermoplastic welds, particularly double interleaf staggered joints connecting the face sheets of the respective panels.

BACKGROUND ART

The use of composites in primary structure in aerospace applications is limited today because of the relatively high cost. A significant contribution to the total cost is the assembly cost where the precured composite elements are assembled, drilled, and fastened. The necessary design for mechanical fastening complicates the structure, especially in thin sections, because of the need for access to both sides of the bond line.

While composites might be adhesively bonded, cocured, or welded, these connecting processes generally produce bonds that rely upon the resin matrix for strength. The bond line lacks any reinforcing material to help with load transfer. These bonds generally have modest strength, and are susceptible to disbonding with shock impact or other "out of plane" forces affecting the assembly. Such forces often arise in environments prone to vibration.

1. Composite Manufacturing

Fiber-reinforced organic resin matrix composites have a high strength-to-weight ratio (specific strength) or a high stiffness-to-weight ratio (specific stiffness) and desirable fatigue characteristics that make them increasingly popular as a replacement for metal in aerospace applications where weight, strength, or fatigue is critical. Thermoplastic or thermoset organic resin composites would be more economical with improved manufacturing processes that reduced touch labor and forming time.

Prepregs combine continuous, woven, or chopped reinforcing fibers with an uncured matrix resin, and usually comprise fiber sheets with a thin film of the matrix. Sheets of prepreg generally are placed (laid-up) by hand or with fiber placement machines directly upon a tool or die having a forming surface contoured to the desired shape of the completed part or are laid-up in a flat sheet which is then draped and formed over the tool or die to the contour of the tool. Then the resin in the prepreg lay up is consolidated (i.e. pressed to remove any air, gas, or vapor) and cured (i.e., chemically converted to its final form usually through chain-extension or fused into a single piece) in a vacuum bag process in an autoclave (i.e., a pressure oven) to complete the part.

The tools or dies for composite processing typically are formed to close dimensional tolerances. They are massive, must be heated along with the workpiece, and must be cooled prior to removing the completed part. The delay caused to heat and to cool the mass of the tools adds substantially to the overall time necessary to fabricate each part. These delays are especially significant when the manufacturing run is low rate where the dies need to be changed frequently, often after producing only a few parts of each kind. An autoclave has similar limitations; it is a batch operation.

In hot press forming, the prepreg is laid-up to create a preform, which is bagged (if necessary), and placed between matched metal tools that include forming surfaces to define the internal, external, or both mold lines of the completed part. The tools and composite preform are placed within a press and then the tools, press, and preform are heated.

The tooling in autoclave or hot press fabrication is a significant heat sink that consumes substantial energy. Furthermore, the tooling takes significant time to heat the composite material to its consolidation temperature and, after curing the composite, to cool to a temperature at which it is safe to remove the finished composite part.

As described in U.S. Pat. No. 4,657,717, a flat composite prepreg panel was sandwiched between two metal sheets made from a superplastically formable alloy and was formed against a die having a surface precisely contoured to the final shape of the part.

Attempts have been made to reduce composite fabrication times by actively cooling the tools after forming the composite part. These attempts have shortened the time necessary to produce a composite part, but the cycle time for heating and cooling remains long. Designing and making tools to permit their active cooling also increases their cost.

Boeing described a process for organic matrix forming and consolidation using induction heating in U.S. Pat. No. 5,530,227. There, Boeing laid up prepregs in a flat sheet sandwiched between aluminum susceptor sheets. The susceptor sheets were susceptible to heating by induction and formed a retort to enclose the prepreg preform. To ensure an inert atmosphere around the preform during curing and to permit withdrawing volatiles and outgassing during the consolidation, the face sheets are welded around their periphery. Such welding unduly increased the preparation time and the cost for part fabrication. It also ruined the susceptor sheets (i.e., prohibited their reuse) which added a significant cost penalty to each part fabricated with this approach. Boeing described in U.S. Pat. No. 5,599,472 a technique that readily and reliably sealed the susceptor sheets of the retort without the need for welding and permitted reuse of the susceptor sheets in certain circumstances. This "bag-and-seal" technique applies to both resin composite and metal processing.

2. Processing in an Induction Press

The dies or tooling for induction processing in Boeing's induction heating workcell are ceramic because a ceramic is not susceptible to induction heating and, preferably, is a thermal insulator (i.e., a relatively poor conductor of heat). Ceramic tooling usually is strengthened and reinforced internally with fiberglass rods or other appropriate reinforcements and externally with metal or other durable strongbacks to permit it to withstand the temperatures and pressures necessary to form, to consolidate, or otherwise to process the composite materials or metals. Ceramic tools cost less to fabricate than metal tools of comparable size and have less thermal mass than metal tooling, because they are unaffected by the induction field. Because the ceramic tooling is not susceptible to induction heating, it is possible to embed induction heating elements in the ceramic tooling and to heat the composite or metal retort without significantly heating the tools. Thus, induction heating can reduce the time required and energy consumed to fabricate a part.

While graphite or boron fibers can be heated directly by induction, most organic matrix composites require a susceptor in or adjacent to the composite material preform to achieve the necessary heating for consolidation or forming. The susceptor is heated inductively and transfers its heat principally through conduction to the preform or workpiece that, in Boeing's prior work, is sealed within the susceptor retort. Enclosed in the metal retort, the workpiece does not experience the oscillating magnetic field which instead is absorbed in the retort sheets. Heating is by conduction from the retort to the workpiece.

Induction focuses heating on the retort (and workpiece) and eliminates wasteful, inefficient heat sinks. Because the ceramic tools in the induction heating workcell do not heat to as high a temperature as the metal tooling of conventional, prior art presses, problems caused by different coefficients of thermal expansion between the tools and the workpiece are reduced. Furthermore, Boeing's induction heating press is energy efficient because significantly higher percentages of input energy go to heating the workpiece than occurs with conventional presses. The reduced thermal mass and ability to focus the heating energy permits change of the operating temperature rapidly which improves the products produced. Finally, the shop environment is not heated as significantly from the radiation of the large thermal mass of a conventional press. The shop is a safer and more pleasant environment for the press operators.

In induction heating for consolidating and forming organic matrix composite materials, Boeing generally places a thermoplastic organic matrix composite preform of PEEK or ULTEM, for example, within the metal susceptor envelope (i.e., retort). These thermoplastics have a low concentration of residual volatile solvents and are easy to use. The susceptor face sheets of the retort are inductively heated to heat the preform. Consolidation and forming pressure consolidate and, if applicable, form the preform at its curing temperature. The sealed susceptor sheets form a pressure zone in the retort in a manner analogous to conventional vacuum bag processes for resin consolidation. The retort is placed in an induction heating press on the forming surfaces of dies having the desired shape of the molded composite part. After the retort and preform are inductively heated to the desired elevated temperature, differential pressure (while maintaining the vacuum in the pressure zone around the preform) across the retort which functions as a diaphragm in the press forms the preform against the die into the desired shape of the completed composite panel.

The retort often includes three, stacked susceptor sheets sealed around their periphery to define two pressure zones. The first pressure zone surrounds the composite panel/preform or metal workpiece and is evacuated and maintained under vacuum. The second pressure zone is pressurized (i.e., flooded with gas) at the appropriate time to help form the composite panel or workpiece. The shared wall of the three layer sandwich that defines the two pressure zones acts as the diaphragm.

Boeing can perform a wide range of manufacturing operations in its induction heating press. These operations have optimum operating temperatures ranging from about 350° F. (175° C.) to about 1850° F. (1010° C.) or even above. For each operation, Boeing usually holds the temperature relatively constant for several minutes to several hours to complete the operations. While temperature can be controlled by controlling the input power fed to the induction coil, a better and simpler way capitalizes on the Curie temperature. Judicious selection of the metal or alloy in the retort's susceptor face sheets avoids excessive heating irrespective of the input power. With improved control and improved temperature uniformity in the workpiece, Boeing produces better products. The method capitalizes on the Curie temperature phenomenon to control the absolute temperature of the workpiece and to obtain substantial thermal uniformity in the workpiece by substantially matching the Curie temperature of the susceptor to the desired temperature of the induction heating operation being performed. The Curie temperature is generally slightly above the processing temperature. With thermoplastic welding, for example, it might be the melt temperature of the matrix resin plus about 1–75° F. (preferably 5–25° F.) so that the bond line remains in the processing window without excessive heating. This temperature control method is explained in greater detail in Boeing's U.S. Pat. No. 5,723,849 or 5,645,744.

U.S. Pat. No. 5,587,098 describes joining large structures in a Boeing induction heating press with localized heating along the bond line. The die is modified to include a "smart" susceptor corresponding to the region of the bond line. The susceptor heats when the embedded induction coil is energized. The temperature of the susceptor is controlled by its Curie point. The susceptor heats the bond line selectively, and the surrounding ceramic dies trap the heat. Residual stress at the joint can be relieved by using a susceptor that has segments of different Curie temperature materials extending in a successive pattern outwardly from the bond line to produce a thermal gradient from ambient to the bond line temperature. We prefer two or three temperature zones with these segments, typically a central welding or bonding zone with outer zones each 50–100° F. lower in temperature than the welding zone.

3. Thermoplastic Welding

Three major joining technologies exist for aerospace composite structure: mechanical fastening; adhesive bonding; and welding. Both mechanical fastening and adhesive bonding are costly, time consuming assembly steps that introduce excess cost even if the parts that are assembled are fabricated from components produced by an emerging, cost efficient process. Mechanical fastening requires expensive hole locating, drilling, shimming, and fastener installation, while adhesive bonding often requires complicated surface pretreatments.

Thermoplastic welding eliminates fasteners. It joins thermoplastic composite components at high speeds with minimum touch labor and little, if any, pretreatments. A conventional welding interlayer tape (compromising the susceptor and surrounding thermoplastic resin either coating the susceptor or sandwiching it) also can simultaneously take the place of shims required in mechanical fastening. As such, composite welding promises to be an affordable joining process. For "welding" a combination of thermoplastic and thermoset composite parts together, the resin that the susceptor melts functions as a hot melt adhesive. If fully realized, thermoplastic-thermoset bonding in addition to true thermoplastic welding will further reduce the cost of composite assembly.

There is a significant stake in developing a successful induction thermoplastic welding process. Its advantages versus traditional composite joining methods are:

reduced parts count versus fasteners minimal surface preparation, in most cases a simple solvent wipe to remove surface contaminants indefinite shelf life at room temperature short process cycle time, typically measured in minutes enhanced joint performance, especially hot/wet and fatigue the possibility of rapid field repair of composites or other structures. There is little or no loss of bond strength after prolonged exposure to environmental influences.

U.S. Pat. No. 4,673,450 describes a method to spot weld graphite fiber reinforced PEEK composites using a pair of electrodes. After roughening the surfaces of the prefabricated PEEK composites in the region of the bond, Burke placed a PEEK adhesive ply along the bond line, applied a pressure of about 50–100 psi through the electrodes, and heated the embedded graphite fibers by applying a voltage in the range of 20–40 volts at 30–40 amps for approximately 5–10 seconds with the electrodes. Access to both sides of the assembly was required in this process which limited its application.

U.S. Pat. Nos. 3,966,402 and 4,120,712 describe thermoplastic welding with induction heating. In these patents, conventional metallic susceptors are used and have a regular pattern of openings of traditional manufacture. Achieving a uniform, controllable temperature in the bond line, which is crucial to preparing a thermoplastic weld of adequate integrity to permit use of welding in aerospace primary structure, is difficult with those conventional susceptors.

Thermoplastic welding is a process for forming a fusion bond between two faying thermoplastic faces of two parts. A fusion bond is created when the thermoplastic on the surface of the two thermoplastic composite parts is heated to the melting or softening point and the two surfaces are brought into contact, so that the molten thermoplastic mixes. The surfaces are held in contact while the thermoplastic cools below the softening temperature.

The same process parameters apply essentially to hot melt thermoplastic adhesive bonds between prefabricated thermoset composites.

Simple as the thermoplastic welding process sounds, it is difficult to perform reliably and repeatably in a real factory on full-scale parts to build a large structure such as an airplane wing box. One difficulty is heating the bond line properly without overheating the entire structure. Another difficulty is achieving intimate contact of the faying surfaces of the two parts at the bond line during heating and cooling because of (1) the normal imperfections in the flatness of composite parts, (2) thermal expansion of the thermoplastic during heating to the softening or melting temperature, (3) flow of the thermoplastic out of the bond line under pressure (i.e., squeeze out), and (4) contraction of the thermoplastic in the bond line during cooling.

The exponential decay of the strength of magnetic fields with distance from their source dictates that, in induction welding processes, the susceptible structure closest to the induction coil will be the hottest, since it experiences the strongest field. Therefore, it is difficult to obtain adequate heating at the bond line between two graphite or carbon fiber reinforced resin matrix composites relying on the susceptibility of the fibers alone as the source of heating in the assembly. For the inner plies to be hot enough to melt the resin, the outer plies closer to the induction coil and in the stronger magnetic field are too hot. The matrix resin in the entire piece of composite melts. The overheating results in porosity in the product, delamination, and, in some cases, destruction or denaturing of the resin. To avoid overheating of the outer plies and to insure adequate heating of the inner plies, we use a susceptor of significantly higher conductivity than the fibers to peak the heating selectively at the bond line instead of in the composites themselves. To create a weld, an electromagnetic induction coil heats a susceptor to melt and cure a thermoplastic resin (also sometimes referred to as an adhesive) to bond the elements of the assembly together.

The current density in the susceptor may be higher at the edges of the susceptor than in the center because of the nonlinearity of the coil, such as occurs when using a cup core induction coil like that described in U.S. Pat. No. 5,313,037. Overheating the edges of the assembly can result in underheating the center, either condition leading to inferior welds because of non-uniform curing. An open or mesh pattern in the susceptor embedded at the bond line allows the resin to create the fusion bond between the composite elements of the assembly when the resin heats and melts.

a. Moving coil welding processes

In U.S. Pat. No. 5,500,511, Boeing described a tailored susceptor for approaching the desired temperature uniformity. Designed for use with the cup coil of U.S. Pat. No. 5,313,037, this susceptor relied upon carefully controlling the geometry of openings in the susceptor (both their orientation and their spacing) to distribute the heat evenly. The susceptor had a regular array of anisotropic, diamond shaped openings with a ratio of the length (L) to the width (W) greater than 1. This susceptor produced a superior weld by producing a more uniform temperature than obtainable using a susceptor having a similar array, but one where the L/W ratio was one. Changing the length to width ratio (the aspect ratio) of the diamond-shaped openings in the susceptor produced a large difference in the longitudinal and transverse conductivity in the susceptor, and, thereby, tailored the current density within the susceptor. A tailored susceptor having openings with a length (L) to width (W) ratio of 2:1 has a longitudinal conductivity about four times the transverse conductivity. In addition to tailoring the shape of the openings to tailor the susceptor, Boeing altered the current density in regions near the edges by increasing the foil density (i.e., the absolute amount of metal). Increasing the foil density along the edge of the susceptor increased the conductivity along the edge and reduced the current density and the edge heating. Boeing increased foil density by folding the susceptor to form edge strips of double thickness or by compressing openings near the edge of an otherwise uniform susceptor. These susceptors were difficult to reproduce reliably. Also, they required careful placement and alignment to achieve the desired effect.

The tailored susceptor was designed to use with the cup coil of U.S. Pat. No. 5,313,037, where the magnetic field is strongest near the edges because the central pole creates a null at the center. Therefore, the tailored susceptor was designed to counter the higher field at the edges by accommodating the induced current near the edges. The high longitudinal conductivity encouraged induced currents to flow longitudinally.

The selvaged susceptor for thermoplastic welding which is described in U.S. Pat. No. 5,508,496 controls the current density pattern during eddy current heating by an induction coil to provide substantially uniform heating to a composite assembly and to insure the strength and integrity of the weld in the completed part. This susceptor is particularly desirable for welding ribs between prior welded spars using an asymmetric induction coil (described in U.S. Pat. No. 5,444,220), because it provides (1) a controllable area of intense, uniform heating under the poles of the coil; (2) a trailing region with essentially no heating; and (3) a leading region with minor preheating.

Boeing achieved better performance (i.e., more uniform heating) in rib welding by using a selvaged susceptor having edge strips without openings. The resulting susceptor, then, has a center portion with a regular pattern of openings and solid foil edges, referred to as selvage edge strips. The susceptor is embedded in a thermoplastic resin to make a susceptor/resin tape that is easy to handle and to use in preforming the composite pieces prior to welding. Also, with a selvaged susceptor, the impedance of the central portion should be anisotropic with a lower transverse impedance than the longitudinal impedance. Here, the L/W ratio of diamond shaped openings should be less than or equal to one. With this selvaged susceptor in the region immediately under the asymmetric induction work coil, current flows across the susceptor to the edges where the current density is lowest and the conductivity, highest.

Generally, the selvaged susceptor is somewhat wider than normal so that the selvage edge strips are not in the bond line. Boeing sometimes removes the selvage edge strips after forming the weld, leaving only a perforated susceptor foil in the weld. This foil has a relatively high open area fraction.

Another difficulty remaining in perfecting the thermoplastic welding process for producing large scale aerospace structures in a production environment involved control of the surface contact of the faying surfaces of the two parts to be welded together. The timing, intensity, and schedule of heat application must be controlled so the material at the faying surfaces are brought to and maintained within the proper temperature range for the requisite amount of time for an adequate bond to form. Intimate contact is maintained while the melted or softened material hardens in its bonded condition.

Large scale parts, such as wing spars and ribs, and the wing skins that are bonded to the spars and ribs, are typically on the order of 20–30 feet long at present, and potentially as much as 100 feet in length when the process is perfected for commercial transport aircraft. Parts of this magnitude are difficult to produce with perfect flatness. Instead, the typical part will have various combinations of surface deviations from perfect flatness, including large scale waviness in the direction of the major length dimension, twist about the longitudinal axis, dishing or sagging of "I" beam flanges, and small scale surface defects such as asperities and depressions. These irregularities interfere with full surface area contact between the faying surfaces of the two parts and actually result in surface contact only at a few "high points" across the intended bond line. Applying pressure to the parts to force the faying surfaces into contact achieves additional surface contact, but full intimate contact is difficult or impossible to achieve in this way. Applying heat to the interface by electrically heating the susceptor in connection with pressure on the parts tends to flatten the irregularities further, but the time needed to achieve full intimate contact with the use of heat and pressure is excessive, can result in deformation of the top part, and tends to raise the overall temperature of the "I" beam flanges to the softening point, so they begin to yield or sag under the application of the pressure needed to achieve a good bond.

Boeing's multipass thermoplastic welding process described in U.S. Pat. No. 5,486,684 (which we incorporate by reference) enables a moving coil welding process to produce continuous or nearly continuous fusion bonds over the full area of the bond line. The result is high strength welds produced reliably, repeatably, and with consistent quality. This process produces improved low cost, high strength composite assemblies of large scale parts fusion bonded together with consistent quality. It uses a schedule of heat application that maintains the overall temperature of the structure within the limit in which it retains its high strength. Therefore, it does not require internal tooling to support the structure against sagging which otherwise could occur when the bond line is heated above the high strength temperature limit. The process also produces nearly complete bond line area fusion on standard production composite parts having the usual surface imperfections and deviations from perfect flatness. The multipass welding process (1) eliminates fasteners and the expense of drilling holes, inspecting the holes and the fasteners, inspecting the fasteners after installation, sealing between the parts and around the fastener and the holes; (2) reduces mismatch of materials; and (3) eliminates arcing from the fasteners.

In the multipass process, an induction heating work coil is passed multiple times over a bond line while applying pressure in the region of the coil to the components to be welded, and maintaining the pressure until the resin hardens. The resin at the bond line is heated to the softening or melting temperature with each pass of the induction work coil and pressure is exerted to flow the softened/melted resin in the bond line and to reduce the thickness of the bond line. The pressure improves the intimacy of the faying surface contact with each pass to improve continuity of the bond. The total time at the softened or melted condition of the thermoplastic in the faying surfaces is sufficient to attain deep interdiffusion of the polymer chains in the materials of the two faying surfaces throughout the entire length and area of the bond line. The process produces a bond line of improved strength and integrity in the completed part. Dividing the time that the faying surfaces are at the melting temperature allows time for the heat in the interface to dissipate without raising the temperature of the entire structure to the degree at which it loses its strength and begins to sag. The desired shape and size of the final assembly is maintained.

A structural susceptor includes fiber reinforcement within the weld resin to alleviate residual tensile strain otherwise present in an unreinforced weld. This susceptor includes alternating layers of thin film thermoplastic resin sheets and fiber reinforcement (usually woven fiberglass fiber) sandwiching the conventional metal susceptor that is embedded in the resin. While the number of total plies in this structural susceptor is usually not critical, Boeing prefers to use at least two plies of fiber reinforcement on each side of the susceptor. This structural susceptor is described in greater detail in U.S. patent application Ser. No. 08/471,625.

The structural susceptor permits gap filling between the welded composite laminates which tailors the thickness (number of plies) in the structural susceptor to fill the gaps, thereby eliminating costly profilometry of the faying surfaces and the inherent associated problem of resin depletion at the faying surfaces caused by machining the surfaces to have complementary contours. Standard manufacturing tolerances produce gaps as large as 0.120 inch, which are too wide to create a quality weld using the conventional susceptors.

It is easy to tailor the thickness of the structural susceptor to match the measured gap by scoring through the appropriate number of plies of resin and fiber reinforcement and peeling them off. In doing so, a resin rich layer will be on both faying surfaces and this layer should insure better performance from the weld.

b. Fixed coil induction welding

Thermoplastic welding using Boeing's induction heating workcell differs from the moving coil processes because of the coil design and resulting magnetic field. The fixed coil workcell presents promise for welding at faster cycle times than the moving coil processes because it can heat multiple susceptors simultaneously. The fixed coil can reduce operations to minutes where the moving coil takes hours. The keys to the process, however, are achieving controllable temperatures at the bond line in a reliable and reproducible process that assures quality welds of high bond strength. The fixed coil induces currents to flow in the susceptor differently from the moving coils and covers a larger area. Nevertheless, proper processing parameters permit welding with the induction heating workcell using a susceptor at the bond line, as described in U.S. Pat. No. 5,641,422.

Another advantage with the fixed coil process is that welding can occur using the same tooling and processing equipment used to consolidate the skin, thereby greatly reducing tooling costs. Finally, the fixed coil heats the entire bond line at one time to eliminate the need for shims that are currently used with the moving coil. To control the temperature and to protect against overheating, "smart" susceptors are used as a retort, as the bond line susceptor material, or both.

The need for a susceptor in the bond line poses many obstacles to the preparation of quality parts. The metal which is used because of its high susceptibility differs markedly in physical properties from the resin or fiber reinforcement so dealing with it becomes a significant issue. A reinforced susceptor overcomes problems with conventional susceptors by including the delicate metal foils (0.10–0.20 inch wide×0.005–0.010 inch thick; preferably 0.10×0.007 inch) in tandem with the warp fibers of the woven reinforcement fabric. The weave fibers hold the foils in place longitudinally in the fabric in electrical isolation from each other yet substantially covering the entire width of the weld surface. This arrangement still has adequate space between the foils for the flow and fusion of the thermoplastic resin. Furthermore, in the bond line, the resin can contact, wet, and bond with the reinforcing fiber rather than confronting the resinphilic metal of the conventional systems. There will be a resin-fiber interface with only short runs of a resin-metal interface. The short runs are the length of the diameter of two weave fibers plus the spatial gap between the weave fibers, which is quite small. Thus, the metal is shielded within the fabric and a better bond results. In this woven arrangement to foil can assume readily the contour of the reinforcement. Finally, the arrangement permits efficient heat transfer from the foil to the resin in the spatial region where the bond will form.

The reinforced susceptor might be an analog of the structural, selvaged, or tailored susceptors of Boeing's other applications (i.e. a tape encased in resin and placed along the bond line) or may be fabricated as part of the facing plies of the prefabricated composites that abut along the bond line.

The susceptor may be a multistrip susceptor having two or more parallel foil strips that extend the full length of the strip. The foil is usually about 0.007 inch thick and each strip is about 0.10–0.20 inch wide. The strips are separated by gaps of comparable width or slightly wider dimension which we etch or ablate from a solid foil. Along the length of the susceptor, periodically, transverse spacer strips span the gap and keep the carrier strips apart. The foil can be virtually any width. It can be about two—four inches wide to match the spar cap width or might even be the fill width of sheets of the composite prepreg used to form the skins. Dimensions given are typical and could be varied.

The strength and durability of adhesive bonds or thermoplastic welds connecting composite structure is improved by adding Z-pin mechanical reinforcement to the bond line. Weld strength can also be improved with a post-weld anneal to control cooling of the bond line.

4. Joining Honeycomb Sandwich Panels

Thermoplastic honeycomb sandwich panels have strength-to-weight ratios and use temperature capabilities unmatched by metals or thermoset composites. These properties make the panels ideally suited for high performance aircraft and spacecraft, especially for cryogenic tanks. But, in making large structures, often two or more subparts must be joined. The joint usually is designed to withstand twice the load of the bulk material, and is impenetrable to liquid and vapor. Traditional joints used a butt or single lap splice combined with composite doublers fastened or adhered on each side of the face sheets. The following problems characteristically plagued these joints:

1. Drilling fastener holes in the graphite reinforced thermoplastic composite was costly and greatly compromised its load carrying capabilities.
2. Fastener holes required extensive sealing to ensure liquid and vapor integrity.
3. Fasteners added significant weight.
4. Film adhesives are restricted to a limited range of temperatures.
5. In highly loaded applications, film adhesives usually age, peel, and crack.
6. Costly modifications to core ends (ramping up or down) or the addition of a backup structure, or both, were often required to support fastener installation.
7. Butt and single lap joints are inherently weak because they do not share fibers between face sheet elements. This discontinuity creates a stress concentration area with limited load carrying capabilities.

Developing a structural joint that is easily and reliable formed without autoclave processing would greatly enhance the application of thermoplastic composite sandwich panels to large structures. Such joints need to be able to withstand tensile stresses in the range of 12,000 lb/inch.

SUMMARY OF THE INVENTION

The present invention is a process for joining thermoplastic composite sandwich panels using thermoplastic welding without autoclave processing in a double interleaf stagger joint or equivalent. The process eliminates fasteners and produces a fluid impervious, sealed joint.

A double interleaf staggered joint for joining thermoplastic fiber-reinforced composites with a thermoplastic seam weld, has at least two fully compacted, laminated face sheets substantially free of volatiles having a plurality of plies of a thermoplastic resin reinforced with fibers. Each face sheet has an edge with a plurality of fingers adapted for interleaving into the joint. The face sheets also have a right hand and a left hand configuration suitable for forming the joint. Resin film between fingers on each joint mating interface insures that fusion of the fingers produces a resin-to-resin bond. Optionally, a metal foil on one surface of the face sheets in the region of the joint reinforces the joint. Each finger is a plurality of plies of fiber-reinforced resin composite with the plies staggered to reduce areas of stress concentration in the joint.

Our preferred process for making the joint includes the steps of:
(a) laying up upper and lower, left and right laminated face sheets having a plurality of plies of fiber-reinforced thermoplastic matrix resin;
(b) positioning separator plies in the edges of the face sheets that will form the joint to create an interleaf split of fiber-reinforced laminated composite fingers;
(c) consolidating the face sheets to produce composites substantially free of volatiles or porosity;
(d) bonding the upper and lower face sheets, respectively, to a honeycomb core with a resin rich layer on the surface of the face sheet that contacts the honeycomb core to form left and right honeycomb core sandwich panels;
(e) removing the separator plies;
(f) interleaving fingers of the left and right face sheets of the left and right panels above and below the core to define double staggered interleaf joints;
(g) optionally, positioning a metal foil between each face sheet and the core in the region of the joint to reinforce the joint; and (h) melting the resin in the joints to form thermoplastic fusion welds.

Our preferred apparatus for forming a fusion weld in a joint between interleaved fingers of at least two, preconsolidated, fiber-reinforced thermoplastic resin matrix composite sandwich panels, includes clamping elements adapted for applying a pressure to the joint, and insulation associated with edges of the platen to contain heat at the joint. The elements including heated, conformal platens matching the configuration of the panels.

DETAILED DESCRIPTION OF A PREFERRED EMBODIMENT

First, this section will provide some general discussion about thermoplastic welding before turning toward its application for joining thermoplastic honeycomb sandwich structure.

1. Thermoplastic Welding with a Moving Coil

Figure 1:
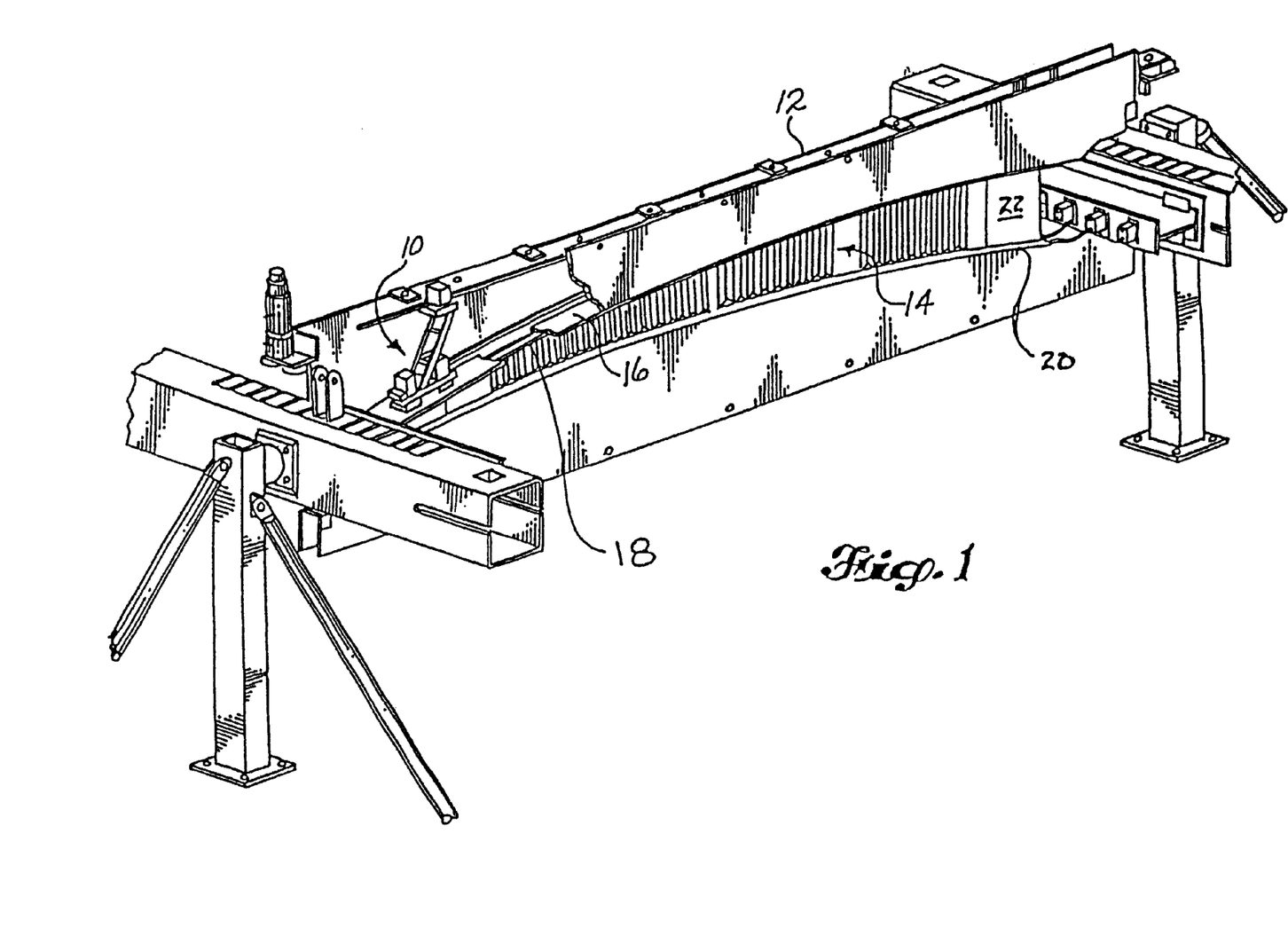
FIG. 1 is a perspective view of a moving coil thermoplastic welding apparatus.
Figure 2:
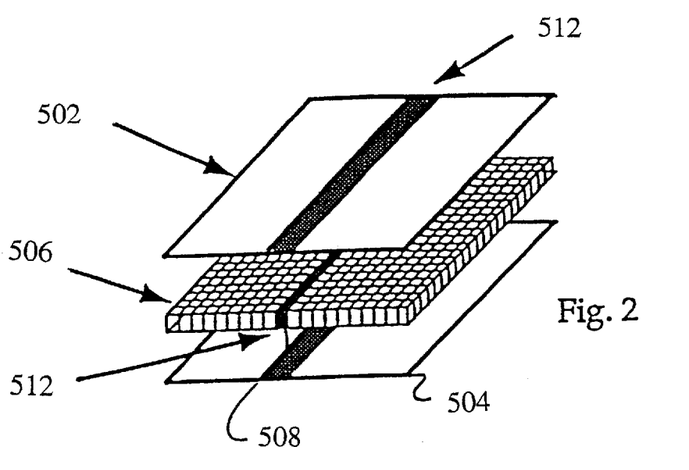
FIG. 2 is an exploded view of a typical joint of the present invention with a foaming adhesive bond connecting honeycomb core and double interleaf staggered joints in the face sheets.
Figure 3:
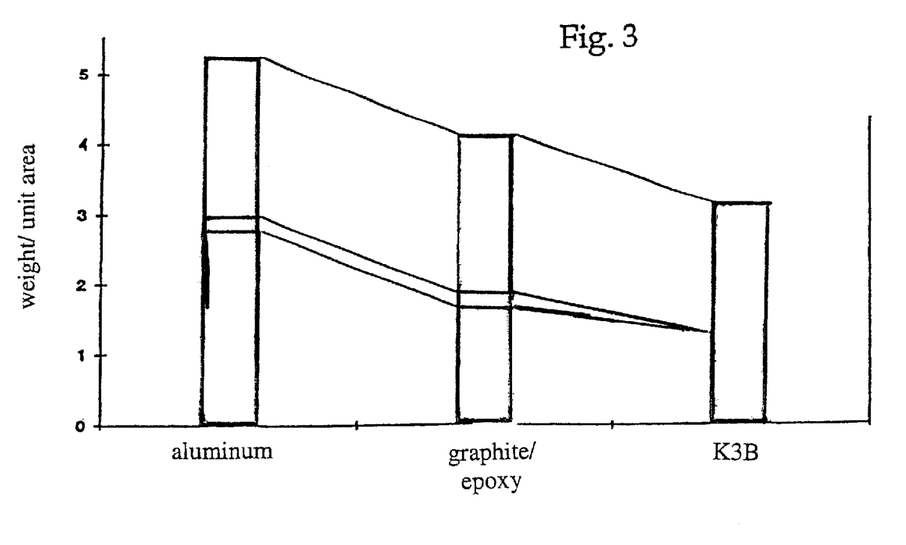
FIG. 3 is a graph showing the relative weight per unit area for three alternative aerospace structures: (1) conventional aluminum skin and stringers; (2) graphite/epoxy skin and stringers; and (3) the sandwich panel configuration of the present invention.
Figure 4:
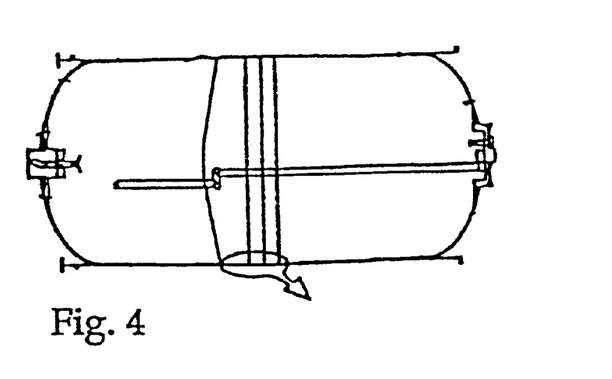
FIG. 4 is a cross-sectional elevation of a cryogenic tank having a thermoplastic seam weld of the present invention.

As shown in FIG. 1, a thermoplastic welding head 10 includes leading and trailing pneumatic pressure pads and a primary induction coil between the pads that is supported on tooling headers 12 over the thermoplastic composite parts or details to be fusion bonded (i.e., welded) together. In the example shown in FIG. 1, the parts include a thermoplastic spar 14 and a thermoplastic wing skin 16, only a small section of which is shown in FIG. 1. The spar 14 is in the form of an "I" beam having a top cap 18, a bottom cap 20, and a connecting web 22. The wing skin is bonded over the full length and surface area of the spar cap 18 with sufficient strength to resist the tensile and peeling forces the wing will experience in flight. The apparatus shown is more fully described in U.S. Pat. No. 5,556,565. The beams might be all composite construction or a hybrid metal webbed composite capped beam as described in U.S. Pat. No. 5,556,565. We could also join thermoset skins and spars with a hot melt thermoplastic adhesive.

Figure 15:
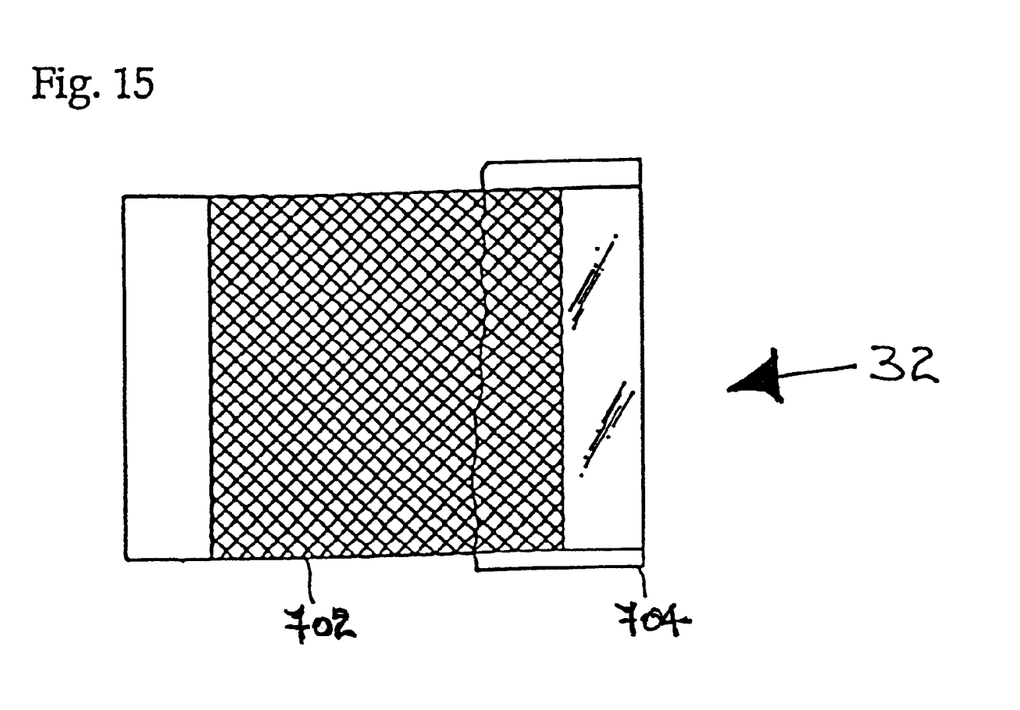
FIG. 15 is a plan view of a typical susceptor for thermoplastic welding.

A copper mesh susceptor 32 (i.e., a metal foil 702 susceptible to induction heating encapsulated in a thermoplastic resin 704, FIG. 15) is inserted between the spar cap 18 and the wing skin 16. Typically the encapsulating resin is the same or a slightly lower melting temperature formulation of the same thermoplastic resin of the spar cap 18 and the lower faying surface of the wing skin 16.

The welding head 10 can be any moving coil apparatus that is capable of applying pressure during induction heating of the bond line to promote fusion and after heating for a period sufficient for the resin to cool and harden in its bonded condition. Suitable welding heads are disclosed in U.S. Pat. Nos. 5,635,094; 5,444,220; and 5,313,037. A preferred welding apparatus uses the induction coil for inducing eddy currents in the susceptor 32. The eddy currents heat the susceptor by electrical resistance heating and soften or melt the thermoplastic resin in the faying surfaces of the parts so it flows, interdiffuses, and fuses together with softened resin of the wing skin and spar cap upon cooling.

The coil shown in the U.S. Pat. No. 5,313,037 patent provides zero eddy current at the center with the current density increasing toward the edges. Use of a tailored susceptor is desirable to counterbalance the nonuniform eddy current density that the coil produces from centerline to edge to achieve uniform heating, and such a susceptor is disclosed in U.S. Pat. No. 5,500,511. A selvaged susceptor designed especially for use with the asymmetric induction coil of U.S. Pat. No. 5,444,220 is described in U.S. Pat. No. 5,508,496.

The primary induction coil is mounted in the welding head in the center of a lower frame which is pinned to a link connecting the lower frame to an upper frame. The upper frame is pulled by a motive apparatus including a stepper motor driving a drive sprocket and a chain loop through a reduction gear unit. A pair of camroll bearings projects from both sides of the lower frame into cam grooves milled into the inside surfaces of the headers to guide and support the lower frame. A similar set of camroll bearings projects outward from the upper frame into a straight cam groove to guide the upper frame as it is pulled by the chain loop from one end of the wing skin to the other.

The process of welding the wing skin to the spar cap begins with assembling the parts together with the susceptor 32 interposed between the faying surfaces of the parts. In the case of a wing box, we attach the susceptor 32 to the outer surfaces of the spar caps 18 and 20 and then sandwich the spars between the upper and lower wing skins 16. The parts are held in position and squeezed together by a force exerted by a pair of air bearing pads. Pressurized air is delivered with air lines and is distributed to the air bearing pressure pads by separate air lines. The air to the pads reduces the frictional drag on the pressure pads on the top surface of the wing skin and helps to cool the parts after the coil has passed. The induction coil moves along the intended bond line over the outer surface of the wing skin in general alignment (±0.125 in) with the susceptors. The moving coil produces an alternating magnetic field which projects through the wing skins and around the susceptor, generating eddy currents in the susceptor. The eddy currents are of sufficient amperage to heat the susceptor, raising the temperature of the thermoplastic material in the faying surfaces to its softening or melting temperature. After the first pass of the welding head over each bond line to seal the box, the process is repeated three or more times, usually increasing the power to the coil after the second pass and, if desired, increasing the pressure exerted by air cylinders on the pressure pads.

The bond strength improves with multiple passes of the welding head over the same bond line. Multiple passes of the induction coil serves to create the optimal conditions for achieving a fusion bond with the desired characteristics of continuity over the entire bond line, and substantial molecular interdiffusion of the materials in the faying surfaces to produce a bond line of high pulloff strength with the complete or nearly complete absence of voids, as discussed in U.S. Pat. No. 5,486,684. Welds having higher pulloff strengths use a barbed susceptor on the bond line.

The mechanisms for achieving a fusion bond include intimate contact and "healing." Intimate contact of the two faying surfaces is a function of force exerted on the parts to squeeze them together, and temperature-dependent viscosity. The force exerted on the parts is distributed over a certain surface area as interfacial pressure tending to bring the faying surfaces together. The viscosity of the surface material is manifested by the tendency of high spots in the surface to yield of flow so that low spots in the two surfaces can come together. "Healing" is partly a process in which molten or softened materials flow together and blend where they come into contact, and partly a process of molecular penetration of the polymer chains in the material of one surface into the molecular matrix of the material in the other faying surface. The average penetration distance of the polymer chains, without the beneficial mixing effect achieved by flowing the materials in the faying surfaces, increases as a quarter power (the fourth root) of time (i.e., $t^{0.25}$).

Objective and easily made observations of a bond line that are indicative of "healing" of the quality of the bond are reduction in bond line thickness, improved ratio of bonded to unbonded surface area in the bond line (or expressed conversely, a reduction of the amount of unbonded surface area in the bond line), and improved pass-through of a bonding resin through openings in the susceptor.

Irregularities, such as hollows, depressions, and asperities (i.e., peaks) in the faying surfaces of the parts, and other deviations from perfect flatness can interfere with and prevent continuous intimate contact along the full surfaces of the parts where bonding is intended. Other deviations from perfect flatness, include scratches and bumps and large scale features such as waviness in the direction of the major length dimension, twist about the longitudinal axis, dishing or sagging of "I" beam flanges, and warping such as humping or bowing in the longitudinal direction. The structural susceptor is particularly suited for dealing with these problems.

Boeing's goal is to produce aircraft structure that eliminates fasteners. Welded structure will be far less expensive because welding eliminates the labor to drill holes accurately and to inspect the fasteners after installation. We also will avoid other problems that fasteners introduce, such as sealing around the fastener and the holes, mismatch of materials, and arcing from the fasteners. To replace the fasteners, however, requires confidence that the welds are uniform and consistent. A failure at any weak point in the weld could lead to catastrophic unzipping of the entire welded structure. An important problem with quality welding is temperature uniformity along the bond line to achieve uniform and complete melt and cure of the resin. Being a "smart" susceptor, the barbed susceptor has a Curie temperature slightly higher than the welding temperature (i.e., about 700° F.) so the possibility of disastrous overheating is reduced.

Boeing embeds the foil in the resin to simplify the welding process. Making a foil/resin tape eliminates the steps of applying separate layers of resin between the respective elements in a composite-susceptor-composite assembly. It also ensures that there will always be adequate resin proximate the susceptor and essentially uniform resin thickness across the welding bond line. The typical tape is about 2–4 inches wide with K3A Avimid resin (an aromatic polyimide), although the resin can be PEEK, PEKK, PES, PEK, ULTEM, or any other thermoplastic. The resin must be compatible with the matrix resin in the composite and generally is the same resin as the matrix resin when welding thermoplastic composites. For the "welding" analog for thermoset composites, the resin will likely be a comparable thermoplastic formulation of the matrix resin in the composites or a compatible resin.

The welding process might cause the assembly to sag when the bond line reaches the melt temperature where the resin flow needed for forming the fusion bond occurs. Supporting the assembly from the inside will prevent sagging. If support tooling is used, the part design must allow removal of the support tooling after the welds are formed. For example, the assembly cannot have completely closed cavities. The need to remove the support tooling can severely impact the parts that we can fabricate.

The integrity of the weld is critical to the performance of the completed, welded structure. The quality of the weld is related to the temperature along the bond line and good welds require control of the temperature within a relatively narrow range during the welding. We particularly want to avoid overheating, so a "smart" susceptor made from a Co, Ni, or Fe alloy with a Curie temperature slightly above the melting temperature of the resin will help ensure that we produce quality welds. By "slightly above" we mean within about a processing window for the resin where a weld will form but the resin will not denature or pyrolyze and the composite will not delaminate. This window extends from the melt temperature ($T_g$) to about +75° F. above the melt temperature. Furthermore, an alloy like INVAR42 (42% Ni–58% Fe) has a coefficient of thermal expansion (CTE) comparable to the resin composite so that embedding the susceptor into the completed part will not have as dramatic an impact if the susceptor is such an alloy rather than copper or another metal where the CTE mismatch between the resin and susceptor is larger.

Suitable thermoplastic resins include polyimides, PEEK, PEK, PEKK, PES, PPS, TORLON (i.e. PEI), or the like. It is especially suited, however, for consolidation or forming of resins that have low volatiles content and that are nonreactive (i.e., the true thermoplastics like PEEK or ULTEM).

In conventional thermoplastic welding, the susceptor is a separate element and may be in sheet, mesh, expanded, milled, selvaged or other suitable form. The susceptor should be structured for the optimum conductivity longitudinally and transversely needed to obtain controlled, reliable, and reproducible heating. Geometry and structure are closely related to the type of induction head used, as those of ordinary skill will understand. In U.S. patent application Ser. No. 08/688,071, Woolley and Scoles integrated the susceptor into the detail part along the bond line. Integrated, the susceptor still needs to have all the favorable properties of the conventional, separate susceptor.

Throughout this discussion, we use "composite" to mean a fiber reinforced organic resin matrix material. The fibers should be of suitable strength to make aerospace structural parts, such as graphite, fiberglass, or carbon fibers. The organic resin can be a thermosetting resin, such as epoxy or bismaleimide, or a thermoplastic, such as ULTEM or K3B polyimide, as we previously described.

A spar detail part might include a stubble surface of Z-pins so that a padup strip includes pins extending upwardly from the panel as well as downwardly from the spar flange. The pins might be carried in a padup strip as Pannell suggested with stubble on both faces with longer, integral pins if the detail parts are thermoplastic rather than inserting the pins into the spar and panel prior to their curing.

If welding and Z-pinning, Boeing prefers to use pins in the detail parts that penetrate further into the parts than the region which softens during the formation of a fusion bond between the details. In this way, the pins stay firmly anchored in their desired orientation. We can heat the bond line through the susceptor with induction or resistance heating.

As previously mentioned, the susceptor typically comprises a metal mesh encased in a resin. The susceptor often includes selvage edge strips. The mesh includes a repeating pattern of diamond shaped openings of length (L) and width (W) separated by fine-line elements. It is encased in resin to provide better heat transfer, to provide adequate resin for the weld, and to reduce the likelihood of introducing porosity in the weld by filling openings in the susceptor.

For combining the integrated susceptor and Z-pins, we might simply apply a metal foil which the pins pierce on insertion to yield a patterned susceptor. We suspect, however, that it would be difficult to obtain controlled heating of this pierced susceptor reliably from part to part and configuration to configuration. Therefore, we prefer to position the pins in the pre-existing openings of the expanded foil. The susceptor might be fashioned as Kirkwood et al. suggested in U.S. patent application Ser. No. 08/486,560 as a "barbed wire" analog. Alternatively, the susceptor might be of the reinforced design woven and aligned with the associated fiber in the reinforcing fabric. Then, the fibers will protect the delicate foil when the pins are inserted.

Post-weld anneal and its controlled cooldown offer a significant strength improvement and a higher quality weld. Parts made with an anneal also show lower process variance. The anneal is done about 125° F. below the resin's melt temperature. The strength enhancement achieved was considerable in the range of about 15–25%. The optimal annealing conditions for all the resin systems or welded assembly configurations still need to be determined. The anneal probably achieves some mobility in the resin or relieves tensile strain otherwise occurring at the bond line. Boeing also has not fully explored the optimal duration of the anneal. Twenty minutes produced the significant strength increases for Scoles. Longer or short cycles or even multiple cycles might prove to be more effective. With combined welding and annealing processes, the bond line cools slowly with a plateau in its cooling at 500° F. Annealing's benefits, however, may be achievable with other cooling cycles that result in the bond line temperature exceeding 500° F. for the 20 minutes or so of the anneal. That is, the anneal might actually be a slow cooldown over the 20 minute anneal cycle at about 5–6° F./minute from the welding temperature of about 620° F. to 500° F.

2. The Type of Joint

Figure 5:
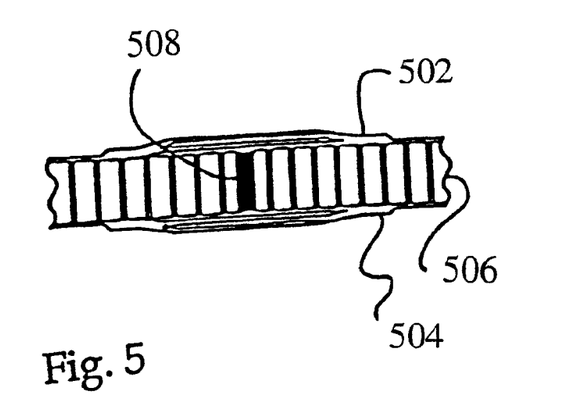
FIG. 5 is an elevation of a typical double interleaf staggered joint in a composite sandwich panel.
Figure 6:
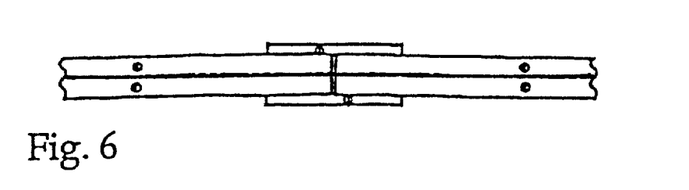
FIG. 6 illustrates a single butt joint with doublers for a face sheet in composite honeycomb sandwich panels.
Figure 7:
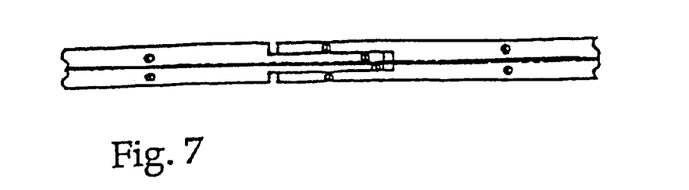
FIG. 7 illustrates a staggered butt joint for a face sheet in composite honeycomb sandwich panels.
Figure 8:
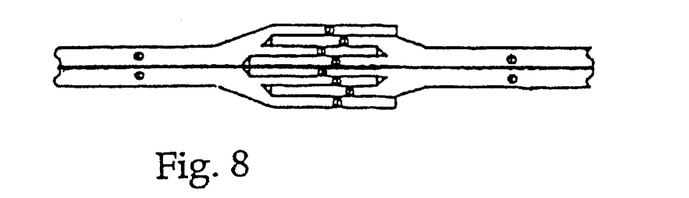
FIG. 8 illustrates a double interleaf joint for a face sheet in composite honeycomb sandwich panels.
Figure 11:
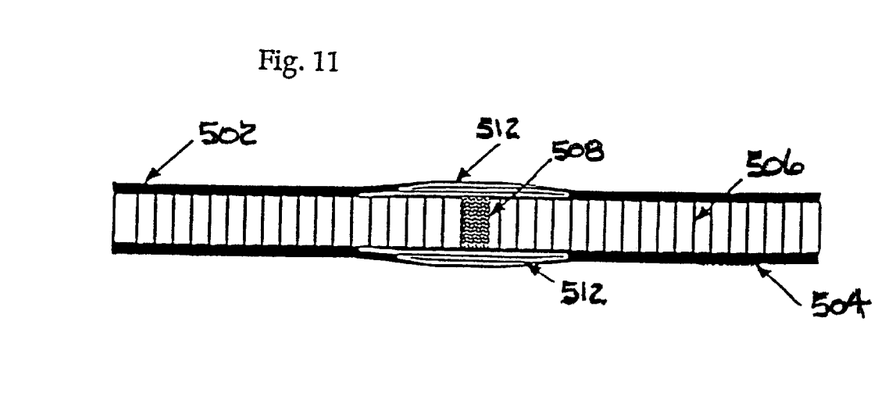
FIG. 11 is a view, similar to FIG. 8, showing the completed double interleaf staggered joint in a composite honeycomb sandwich panel.

Now, turning to the process of the present invention for joining a (with thermoplastic welds) thermoplastic composite sandwich panel, we explored several joint designs in autoclave tests. The autoclaved joints were easier to prepare to screen the designs for the highest strength joint configuration. We sought an autoclaved joint having a strength of 16,000 lb/in, believing that nonautoclave processing would reduce the joint strength by about 20%. We investigated single butt (FIG. 6), staggered butt (FIG. 7), various interleaf joints, joints reinforced with doublers, and joints reinforced with titanium foil. From these tests we determined that a double interleaf joint (FIG. 8 or 11) was the best candidate for nonautoclave processing trials. Those subsequent trials led us to add a resin encapsulated titanium foil (902, FIG. 9) on the underside of the joint to support the laminate plies 73 during remelt in the thermoplastic welding (fusion) process. Our preferred joint is shown in FIG. 5. It includes upper and lower face sheets 502 and 504 sandwiching a honeycomb core 506. The face sheets each include a double interleaf staggered butt joint (FIG. 8) thermoplastic weld. The face sheets are adhered to the honeycomb core. The core has a foaming adhesive butt joint 508 along the thermoplastic weld bond line of the face sheets.

Figure 9:
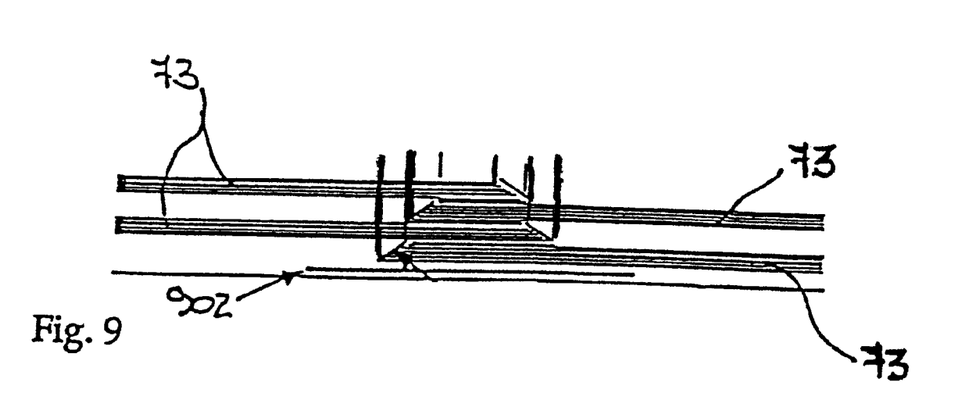
FIG. 9 is a detail illustrating the features of a preferred double interleaf staggered joint of the present invention.
Figure 10:
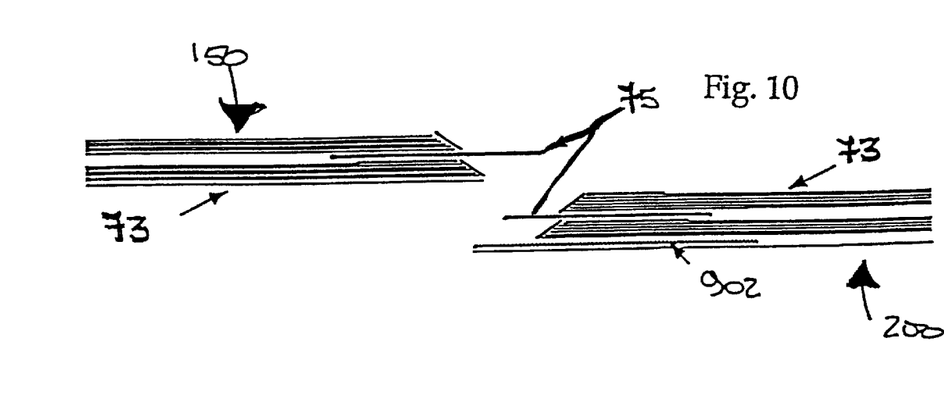
FIG. 10 illustrates the process for interleaving left and right hand panels to assemble a joint of the present invention.

The double interleaf joint (FIG. 8) was slightly more difficult to make than a staggered butt joint (FIG. 7), but it was inherently stronger. The double interleaf autoclaved joint had a strength in excess of 16,000 lb/in for a twelve ply base laminate (K3B/thermoplastic polyimide resin reinforced with graphite fibers). FIG. 10 shows our preferred embodiment for such a double interleaf nonautoclave joint. The left layup 150 and right hand layup 200 consist of twelve ply thermoplastic composite tape or fabric ply stacks. These stacks are symmetric about a centerline with each half layup consisting of six plies. Each ply is staggered typically 0.1 inches away from the previous ply. The first six plies of the right hand layup are located below the first six plies of the left hand layup with the end ply extending the total joint length (2.7 inches in the preferred configuration) away from the first ply of the right hand layup. Next, the second six plies of the right hand layup lie on top of the first six plies of the left hand layup with the end ply located 0.1 inches away from the last ply of the first six ply right hand layup. Finally, the second six plies of the left hand layup are located on top of the second six plies of the right hand layup with the end ply residing 0.1 inches away from the last ply of the first six ply left hand layup (FIG. 9).

The typical ply table for the groups of plies is:

|  |  | Ply Layer | | | | | |
| --- | --- | --- | --- | --- | --- | --- | --- |
| Ply | (11) & (14) | 0 | 45 | 60 | 90 | −60 | 0 |
| Group | (6) & (7) | 0 | −60 | 90 | 60 | 45 | 0 |

This joint is a gradually ramped double interleaf joint 512 (FIG. 11) with a center joint overlap region of about 0.5 inch length. To support the plies of the joint over a honeycomb core, we include a 0.005 inch thick chromic acid anodized, titanium foil 902 (FIG. 10) primed with a K3B thermoplastic polyimide resin slurry and cocured with one ply of 0° K3B composite tape on each side of the foil. Between each leg of the interleaf, a layer of 0.005 inch thick thermoplastic resin (K3A or ULTEM) to facilitate nonautoclave joining. A 0.010 inch thick optional layer of thermoplastic resin (K3A or ULTEM) facilitates bonding of the joint to the honeycomb substructure.

The benefits of the double interleaf staggered joint are:
1. The interleaf creates common fibers that aid in load carrying between left and right hand laminate members.
2. The staggers within the joint eliminate stress concentration regions.
3. The geometry of the joint lends itself to nonautoclave processing.
4. The titanium foil in the joint adds to its strength and shifts the joint failure mechanism from the ramp-up area to the foil edge.
5. The titanium supports the laminate during nonautoclave fusion operations.
6. Mechanical fasteners and associated holes are not required to create the joint.
7. The joint is inherently stronger than other similar weight joint configurations.
8. The completed joint is impenetrable to liquid and vapor.
9. The joint is only slightly harder to produce than easy butt joints with doublers, but its strength is dramatically higher.

3. Nonautoclave Processing to Form the Joint

The first step in making joined honeycomb panels involves laying up an upper left, upper right, and lower left, and lower right face sheet 73 using removable separator plies an 75 half way through the stacks to create an interleaf split (see FIG. 10) of laminated fiber-reinforced fingers. Preconsolidation of the face sheets is required prior to honeycomb core assembly, since the temperatures (665° F. for K3B) and pressures (185 psi for K3B) required to fully consolidate the thermoplastic are incompatible (will dimple and cookie cut face sheets or crush the core with low density cores (such as ⅜" cell, 3 lb/ft³ density titanium core). Therefore, the face sheet layups are consolidated in an autoclave using conventional bagging and consolidation cycles to ensure that the face sheets are fully compacted and are substantially free of volatiles (e.g., prepreg lacquers or solvents).

The separator plies (75) should be a thick nonporous release film (such as Armalon) that will not contaminate the joint. Initial attempts used steel shims, treated with Frekote (a release agent), but the shims left a residual film after consolidation. Surface abrading was required to insure removal of the residual film.

The staggered plies should be laid up with a typical dimension of at least 0.1"/stagger to insure that there are no abrupt drop-offs (hence areas of stress concentration) within the joint. Initially, we laid up face sheets plies without staggers and ground back the plies to create a ramp after consolidation. Without the staggers however, since the bonding resin was not adhered to the laminate in a high-temperature high-pressure autoclave cycle, the final bond quality suffered.

A resin film (such as K3A or ULTEM) should be laid up at all joint mating interfaces to insure that the bonding resin is fused to the base laminate in the preconsolidation cycle. Thereby, during subsequent nonautoclave fusion steps a resin-to-resin bond is made rather than a resin-to-base laminate bond.

A titanium foil and bonding resin film are placed under face sheets to aid in subsequent joining of left and right hand core assemblies.

The third step in making a thermoplastic/honeycomb joint is to detool the preconsolidated face sheets. The separator plies 75 stay with the face sheets through this operation. Minor deflashing and abrading may be required to insure proper mating of the left and right hand face sheets, but no cleanout of the split interior or addition of bonding resin is required prior to joint assembly.

Then, the preconsolidated face sheets are bonded to the honeycomb core. The face sheets are made with a resin rich layer on the side that mates to the core to facilitate fusion to a resin infused core. A spacer block (typically INVAR 42) is used at the bonded core ends to support the staggered face sheets and the separator film is left in place from the previous step. The face sheet to core bonding autoclave cycle is a lower temperature (525° F. for K3B laminates with K3A resin film) and pressure (35 psi for K3B/K3A) cycle than that used to preconsolidate the face sheets to avoid damaging the core or face sheets. This cycle can be at a lower temperature and pressure since a resin (K3A) to resin (K3A) fusion is being made.

The fifth step in making a thermoplastic/honeycomb joint involves removing the spacer blocks and assembling the left and right hand face sheets into the interleaf stagger configuration. Thereafter, without an autoclave, we fuse (i.e., create a thermoplastic weld between) the interleaved fingers together to form the Double Interleaf joint and butt the honeycomb together. In most cases a conventional foaming adhesive between the mated cores creates a structural joint. This foaming adhesive is usually a thermoset or thermoplastic resin that foams and/or cures as the face sheets are being melted together.

A description of the apparatus we have developed to make nonautoclave joints is detailed in the following section.

4. Nonautoclave Joining Apparatus

Figure 12:
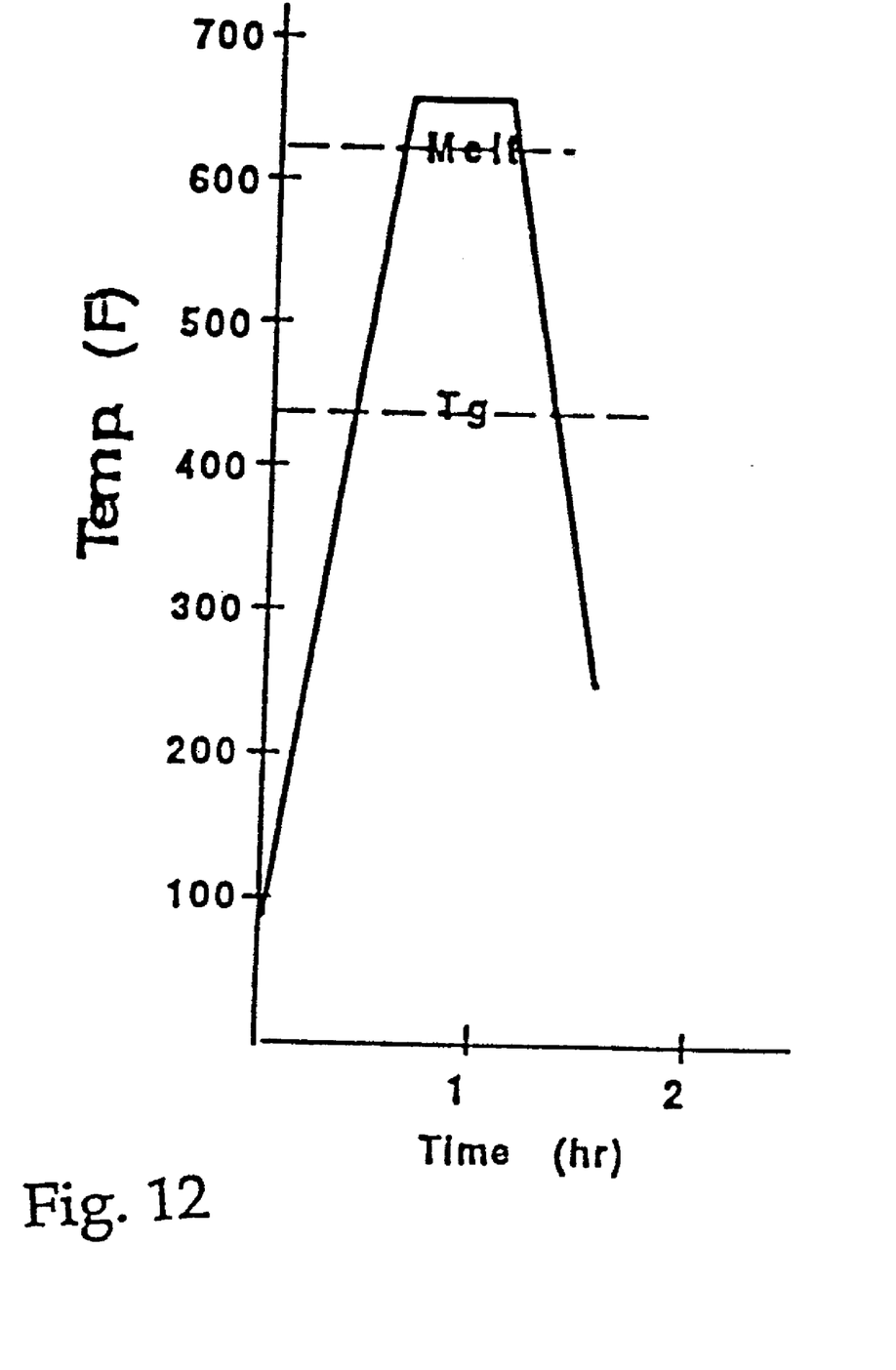
FIG. 12 is a typical processing cycle used to form the thermoplastic seam weld.

Through a series of process optimization trials, we created a high quality thermoplastic/honeycomb joint (for example, K3A as the bonding resin, K3B as the resin in the face sheets and a titanium, honeycomb core by subjecting the double interleaf joint to a 50 psi, 30 minute, 650° F. process cycle. This cycle (FIG. 12) was hot enough to remelt the thermoplastic face sheet to honeycomb bond created in a previous autoclave operation. Therefore, a layer of titanium foil was placed under the joint heatup zone to support the face sheets during the fusion cycle. During this nonautoclave joining cycle, the foaming adhesive that creates the core joint will also expand and cure.

Figure 13:
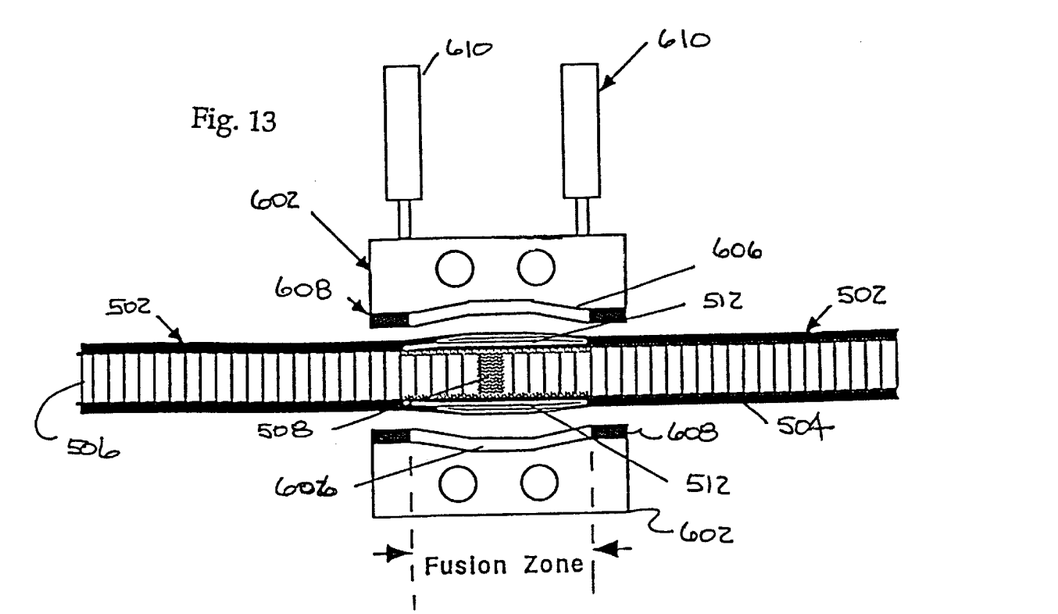
FIG. 13 is an elevation of our preferred joint forming apparatus.
Figure 14:
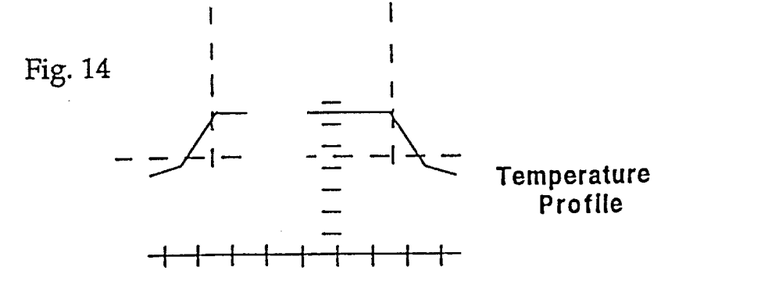
FIG. 14 illustrates the temperature profile achievable with the joint forming apparatus of FIG. 13.

Our preferred joint forming tool is shown in FIG. 13. It clamps and holds the assembled double interleaf composite honeycomb panels together while creating a bond line pressure of about 50 psi throughout the fusion cycle. This pressure aids the formation of an interdiffused fusion bond in the resin without excessive squeeze out of resin from the preconsolidated laminates. The tool uses heated platens 602 to heat (or cool) the joint. The center of the clamping apparatus holds a machined INVAR or steel plate 606 that is thermally conductive and configured to match the surface configuration of the completed joint. Outside edges 608 of the platens 606 are insulated with mica board or the like to contain heat at the joint and to create a proper cooling profile for the joint. The insulation also ensures that the face sheets 502 and 504 do not remelt outside the fusion zone. Pneumatic or hydraulic cylinders 610 connect with the platens 602 through suitable backup structure for imparting the desired pressure on the bond line during the fusion cycle. The tool has matching inner and outer platens to sandwich the bond line during the fusion cycle. Heating might be accomplished by fabricating the plate from a Curie alloy susceptible to induction heating, as described in Boeing's patents, particularly U.S. Pat. No. 5,587,098, which we incorporate by reference. The typical temperature profile we achieve in the fusion zone is shown in FIG. 14.

Benefits of the nonautoclave joining apparatus are:
1. The device can precisely control temperature and pressure throughout the fusion cycle.
2. A variable temperature zone is established that is sufficient to melt and fuse the double interleaf joint but does not damage the laminate-to-face sheet bond.
3. The platens are shaped so that the joint has the desired, final configuration.
4. The apparatus can be constructed to fabricate joints of practically any desired contour.
5. The apparatus can be constructed using electric or oil heating and pneumatic or hydraulic pressure application.

By selecting the proper joint configuration and by optimizing the nonautoclave process, high quality joints that consistently meet the goal of a 12,000 lb/inch tensile capability are obtainable. The design, process cycles, and joining apparatus support a nonautoclave fusing (welding) method that can be used to join large thermoplastic/honeycomb panels. The resulting joints have strength-to-weight characteristics unmatched by fastened, bonded, or fastened and bonded systems. In addition, the double interleaf joint has the inherent advantages that it is impenetrable to liquid and vapor and can be inspected nondestructively by conventional techniques.

The joint forming apparatus can clamp the entire seam and form the weld in a single operation. The apparatus might also clamp only a segment of the weld in which case the weld is made in successive sections. Finally, the clamping apparatus might move along the seam continuously or in steps guided by appropriate jigs and tools to guide the clamping apparatus when creating the weld. Susceptors might be buried in the joint along the interfaces between the fingers or within the fingers themselves to aid in heating the joints to the welding temperature using induction heating, resistance heating, or a combination of these heating methods.

The double interleaf staggered joint can be reinforced with Z-pin reinforcement added while forming the weld or inserted after formation. The resin films, for example, along the interfaces of the fingers might include Z-pins in a fashion analogous to the technique described in copending U.S. patent application Ser. No. 08/660,060 by Shawn Pannell.

While we have described preferred embodiments, those skilled in the art will readily recognize alternatives, variations, and modifications which might be made without departing from the inventive concept. Therefore, interpret the claims liberally with the support of the full range of equivalents known to those of ordinary skill based upon this description. The examples illustrate the invention and are not intended to limit it. Accordingly, define the invention with the claims and limit the claims only as necessary in view of the pertinent prior art.

We claim:
1. A method for making a thermoplastic fusion weld joint in thermoplastic composite, honeycomb core sandwich structure without autoclave processing during formation of the joint, comprising the steps of:
   (a) laying up upper and lower, left and right laminated face sheets having a plurality of plies of fiber-reinforced thermoplastic matrix resin;
   (b) positioning separator plies along edges of the face sheets to define fingers that will overlap and interleaf and that will form the joint to create an interleaf split of fiber-reinforced laminated composite fingers adapted for forming a double staggered interleaf joint;
   (c) consolidating the face sheets to produce composites substantially free of volatiles or porosity with consolidated fingers along the edges where the joint will be made;
   (d) bonding the upper and lower face sheets, respectively, to a honeycomb core with a resin rich layer on the surface of the face sheet that contacts the honeycomb core to form the left and right honeycomb core sandwich structure;
   (e) removing the separator plies;
   (f) interleaving respective fingers of the left and right face sheets above and below the core to define double staggered interleaf joints;
   (g) optionally, positioning a metal foil between the core and each face sheet beneath the fingers in the region of the joint to reinforce the joint; and
   (h) melting and mixing the resin between fingers in the joints to form thermoplastic fusion welds and to complete double staggered interleaf joints above and below the honeycomb core.

2. The method of claim 1 wherein the fingers include staggered plies to reduce areas of stress concentration in the joint.

3. The method of claim 1 wherein the separator plies are a nonporous release film.

4. The method of claim 1 comprising the step of:
   positioning a thermoplastic resin film between each interleaved finger to insure a resin-to-resin bond upon fusion.

5. The method of claim 1 wherein consolidating the face sheets occurs in an autoclave at an elevated temperature and pressure and wherein the bonding step occurs at a lower temperature and a lower pressure than the consolidating step.

6. The method of claim 1 further comprising the step of:
   curing a foaming adhesive between the honeycomb core of the left and right structures to create a structural joint underlying the welds when forming the fusion welds.

7. The method of claim 6 wherein step (h) uses an inductively heated press having facing tools for contacting the inside and outside of the structure.

* * * * *